US009191813B2

(12) United States Patent
Lim et al.

(10) Patent No.: US 9,191,813 B2
(45) Date of Patent: Nov. 17, 2015

(54) SYSTEM AND METHOD FOR MANAGING OTA PROVISIONING APPLICATIONS THROUGH USE OF PROFILES AND DATA PREPARATION

(75) Inventors: Jaemin Lim, Seoul (KR); Daeman Kwon, Seoul (KR); Donghyun Kim, Yongin-si (KR); Byungkwon Jeon, Seoul (KR)

(73) Assignee: MOZIDO CORFIRE—KOREA, LTD., Sungnam-si (KR)

( * ) Notice: Subject to any disclaimer, the term of this patent is extended or adjusted under 35 U.S.C. 154(b) by 491 days.

(21) Appl. No.: 13/310,308

(22) Filed: Dec. 2, 2011

(65) Prior Publication Data

US 2012/0174189 A1 Jul. 5, 2012

Related U.S. Application Data

(60) Provisional application No. 61/428,853, filed on Dec. 30, 2010, provisional application No. 61/428,846, filed on Dec. 30, 2010, provisional application No. 61/428,851, filed on Dec. 30, 2010, provisional application No. 61/428,852, filed on Dec. 30, 2010.

(51) Int. Cl.
*H04L 29/06* (2006.01)
*H04W 12/06* (2009.01)
*H04W 12/04* (2009.01)

(52) U.S. Cl.
CPC ............. *H04W 12/06* (2013.01); *H04L 63/067* (2013.01); *H04W 12/04* (2013.01)

(58) Field of Classification Search
USPC .......................................................... 726/3
See application file for complete search history.

(56) References Cited

U.S. PATENT DOCUMENTS

| 5,221,838 | A | 6/1993 | Gutman et al. |
| 6,157,859 | A * | 12/2000 | Alt ..................................... 607/4 |
| 6,199,762 | B1 | 3/2001 | Hohle |
| 6,480,957 | B1 | 11/2002 | Liao et al. |
| 6,487,403 | B2 | 11/2002 | Carroll |
| 6,662,020 | B1 * | 12/2003 | Aaro et al. .................. 455/552.1 |
| 6,950,939 | B2 | 9/2005 | Tobin |
| 7,024,390 | B1 | 4/2006 | Mori et al. |
| 7,065,341 | B2 | 6/2006 | Kamiyama et al. |
| 7,146,159 | B1 | 12/2006 | Zhu |

(Continued)

OTHER PUBLICATIONS

GlobalPlatform, Card Specification, Version 2.2, published Mar. 2006.

(Continued)

*Primary Examiner* — Izunna Okeke
*Assistant Examiner* — Ali Shayanfar
(74) *Attorney, Agent, or Firm* — Sughrue Mion, PLLC

(57) ABSTRACT

A method using a non-transitory processor for providing an application product including receiving an application profile, a key profile, a secure element (SE) profile, and a mobile terminal profile; establishing a link between the received profiles, in which the link is established for assembling the application product; and applying a limitation to the application product, in which the applied limitation determines whether the application product is accessible to a user. A method using a non-transitory processor for data preparation in a Trusted Service Manager (TSM) including receiving data from a service provider, in which the received data is in a Data Grouping Identifier (DGI) format or a raw data format; and processing the data using at least one of a logical data preparation and a physical data preparation.

12 Claims, 8 Drawing Sheets

(56) References Cited

U.S. PATENT DOCUMENTS

| | | |
|---|---|---|
| 7,149,545 B2 | 12/2006 | Hurst et al. |
| 7,155,411 B1 | 12/2006 | Blinn et al. |
| 7,197,297 B2 | 3/2007 | Myles et al. |
| 7,233,785 B2 | 6/2007 | Yamagishi et al. |
| 7,233,926 B2 | 6/2007 | Durand et al. |
| 7,236,742 B2 | 6/2007 | Hall et al. |
| 7,286,818 B2 | 10/2007 | Rosenberg |
| 7,389,123 B2 | 6/2008 | Rydgren et al. |
| 7,415,721 B2 | 8/2008 | Fransdonk |
| 7,447,494 B2 | 11/2008 | Law et al. |
| 7,454,233 B2 | 11/2008 | Lu et al. |
| 7,469,151 B2 | 12/2008 | Khan et al. |
| 7,490,775 B2 | 2/2009 | Biderman |
| 7,527,208 B2 | 5/2009 | Hammad et al. |
| 7,628,322 B2 | 12/2009 | Holtmanns et al. |
| 7,689,205 B2 | 3/2010 | Toy et al. |
| 7,689,508 B2 | 3/2010 | Davis et al. |
| 7,707,113 B1 | 4/2010 | DiMartino et al. |
| 7,708,194 B2 | 5/2010 | Vawter |
| 7,711,392 B2 | 5/2010 | Brown et al. |
| 7,819,307 B2 | 10/2010 | Lyons et al. |
| 7,822,439 B2 | 10/2010 | Teicher |
| 7,822,688 B2 | 10/2010 | Labrou et al. |
| 8,312,270 B1 * | 11/2012 | Chou et al. .................... 713/168 |
| 2003/0093582 A1 * | 5/2003 | Cruz et al. .................... 709/328 |
| 2005/0015587 A1 * | 1/2005 | Stransky ............ H04L 63/0823 713/156 |
| 2006/0106836 A1 * | 5/2006 | Masugi et al. ................ 707/101 |
| 2007/0150246 A1 * | 6/2007 | Tabbara et al. ................ 703/11 |
| 2007/0170245 A1 * | 7/2007 | Elbaum et al. ................ 235/380 |
| 2008/0010215 A1 | 1/2008 | Rackley III et al. |
| 2008/0040265 A1 | 2/2008 | Rackley III et al. |
| 2008/0092204 A1 * | 4/2008 | Bryce et al. .................... 725/143 |
| 2008/0134165 A1 * | 6/2008 | Anderson et al. ............. 717/173 |
| 2008/0208742 A1 | 8/2008 | Arthur et al. |
| 2009/0006951 A1 * | 1/2009 | Mori et al. .................... 715/273 |
| 2009/0106350 A1 * | 4/2009 | Chen et al. .................... 709/203 |
| 2009/0124234 A1 | 5/2009 | Fisher et al. |
| 2009/0221266 A1 * | 9/2009 | Ohta et al. .................... 455/411 |
| 2009/0307139 A1 | 12/2009 | Mardikar et al. |
| 2009/0307140 A1 | 12/2009 | Mardikar |
| 2010/0027469 A1 * | 2/2010 | Gurajala et al. .............. 370/328 |
| 2010/0125495 A1 | 5/2010 | Smith et al. |
| 2010/0125508 A1 | 5/2010 | Smith |
| 2010/0138518 A1 | 6/2010 | Aiglstorfer et al. |
| 2010/0145835 A1 | 6/2010 | Davis et al. |
| 2010/0205432 A1 * | 8/2010 | Corda et al. .................. 713/159 |
| 2010/0211499 A1 * | 8/2010 | Zanzot et al. ................... 705/40 |
| 2010/0211507 A1 | 8/2010 | Aabye et al. |
| 2010/0275242 A1 | 10/2010 | Raffard et al. |
| 2010/0275269 A1 | 10/2010 | Vilmos et al. |
| 2010/0291904 A1 * | 11/2010 | Musfeldt et al. ...... G06F 21/604 455/414.1 |
| 2010/0306076 A1 | 12/2010 | Taveau et al. |
| 2010/0306107 A1 | 12/2010 | Nahari |
| 2010/0330958 A1 | 12/2010 | Corda et al. |
| 2011/0078081 A1 | 3/2011 | Pirzadeh et al. |
| 2011/0231332 A1 * | 9/2011 | Abraham et al. ........ G06F 21/34 705/325 |

OTHER PUBLICATIONS

Chinese Office Action for corresponding Application No. 201180061577.8 dated Feb. 27, 2015.

Singapore Office Action for corresponding Application No. 2013043005 issued May 19, 2015.

* cited by examiner

SYSTEM AND METHOD FOR MANAGING OTA PROVISIONING APPLICATIONS THROUGH USE OF PROFILES AND DATA PREPARATION

CROSS REFERENCE TO RELATED APPLICATION

This application claims priority from and the benefit under 35 U.S.C. §119(a) of U.S. Provisional Patent Application No. 61/428,853, filed on Dec. 30, 2010, which is incorporated by reference for all purposes as if fully set forth herein. Also, the present application is related to U.S. Provisional Patent Application Nos. 61/428,846, 61/428,851 and 61/428,852, all of which have been filed on December 30. Applicant hereby incorporates by reference the above-mentioned provisional applications, which are not admitted to be prior art with respect to the present invention by their mention here or in the background section that follows.

BACKGROUND OF THE INVENTION

1. Field

The following description relates to provisioning of virtual card applets on a secure element of a mobile terminal.

2. Discussion of the Background

With the recent advancements of mobile technology, more features have been added to mobile terminals. Addition of applications related to Global Positioning System (GPS) to mobile office products have made mobile terminals commonplace for many consumers. In order to further utilize mobile technology to better cater to consumer's daily requirements, attempts have been made to provide for a mobile financial management system to replace conventional physical wallets. Specifically, this mobile wallet functionality was sought to be realized through provisioning of card issuer's account information directly into a secure element (SE) of the mobile terminal. The SE may be a smart card chip capable of storing multiple applications, including of account specific information that may not be easily accessed by external parties. A mobile wallet application may have the similar composition as the conventional wallet, which may contain payment cards, member cards, transportation cards, and loyalty cards.

Mobile wallet functionality may be further enhanced by provisioning the user financial credential onto mobile terminals equipped with a Near Field Communication (NFC) enabled chipset. Once the user financial credentials have been provisioned onto the SE of the NFC enabled mobile terminal, the provisioned NFC enabled terminal may transfer information or make payments to another NFC compatible device, such as a Point of Sale (POS) terminal, by coming near within a close distance of one another without physically contacting each other. This type of technology is conventionally referred to as "contactless" technology and a payment made with this technology is referred to as "contactless" payment. Despite the numerous benefits that may be available utilizing the described technology, there has been lack of practical solutions to provision sensitive user information to the NFC enabled mobile terminals.

One possible solution for provisioning mobile wallet cards is to perform the provisioning at a secure facility controlled by the mobile wallet card issuer. However, this solution may require users to bring their mobile terminal to the physical mobile wallet card issuer for provisioning. This process has to be repeated for every mobile wallet card the user seeks to provision at different card issuer facility, making the concept of mobile wallet impractical.

In addition, with much focus on mobile commerce, many competing service providers may seek providing their services to the consumers. However, such services may be offered to the consumer without regard to the mobile terminal capabilities or mobile service providers utilized by the consumers. Due to technical or business compatibility, there may be numerous applications that may be inapplicable to the consumer's attributes. Accordingly, consumers are often bombarded with various applications that may be inapplicable to the consumer, making the process more difficult than necessary.

SUMMARY

Exemplary embodiments of the present invention provide a method for providing an application to a user. Exemplary embodiments of the present invention provide a method for providing data preparation based on a data type.

Additional features of the invention will be set forth in the description which follows, and in part will be apparent from the description, or may be learned by practice of the invention.

Exemplary embodiments of the present invention provide a method using a non-transitory processor for providing an application product including receiving an application profile, a load file profile, a secure element (SE) profile, and a mobile terminal profile; establishing a link between the received profiles, in which the link is established for assembling the application product; and applying a limitation to the application product, in which the applied limitation determines whether the application product is accessible to a user.

Exemplary embodiments of the present invention provide a method using a non-transitory processor for data preparation in a Trusted Service Manager (TSM) including receiving data from a service provider, in which the received data is in a Data Grouping Identifier (DGI) format or a raw data format; and processing the data using at least one of a logical data preparation and a physical data preparation.

Exemplary embodiments of the present invention provide a method using a non-transitory processor for filtering an application product including receiving an application profile, a load file profile, a key profile, a secure element (SE) profile, and a mobile terminal profile; receiving a key; establishing a link between the key profile and the key; establishing a link between the received profiles, in which the link is established for assembling the application product; applying a limitation to the application product, in which the limitation is a technical limitation, a business rule limitation, or a certification limitation; receiving mobile terminal information, in which the mobile terminal information includes at least one of operating system information, SE type information, hardware information, and application information stored in a mobile terminal; and filtering the applicable application product based on the applied limitation and the mobile terminal information for displaying to a user.

It is to be understood that both foregoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
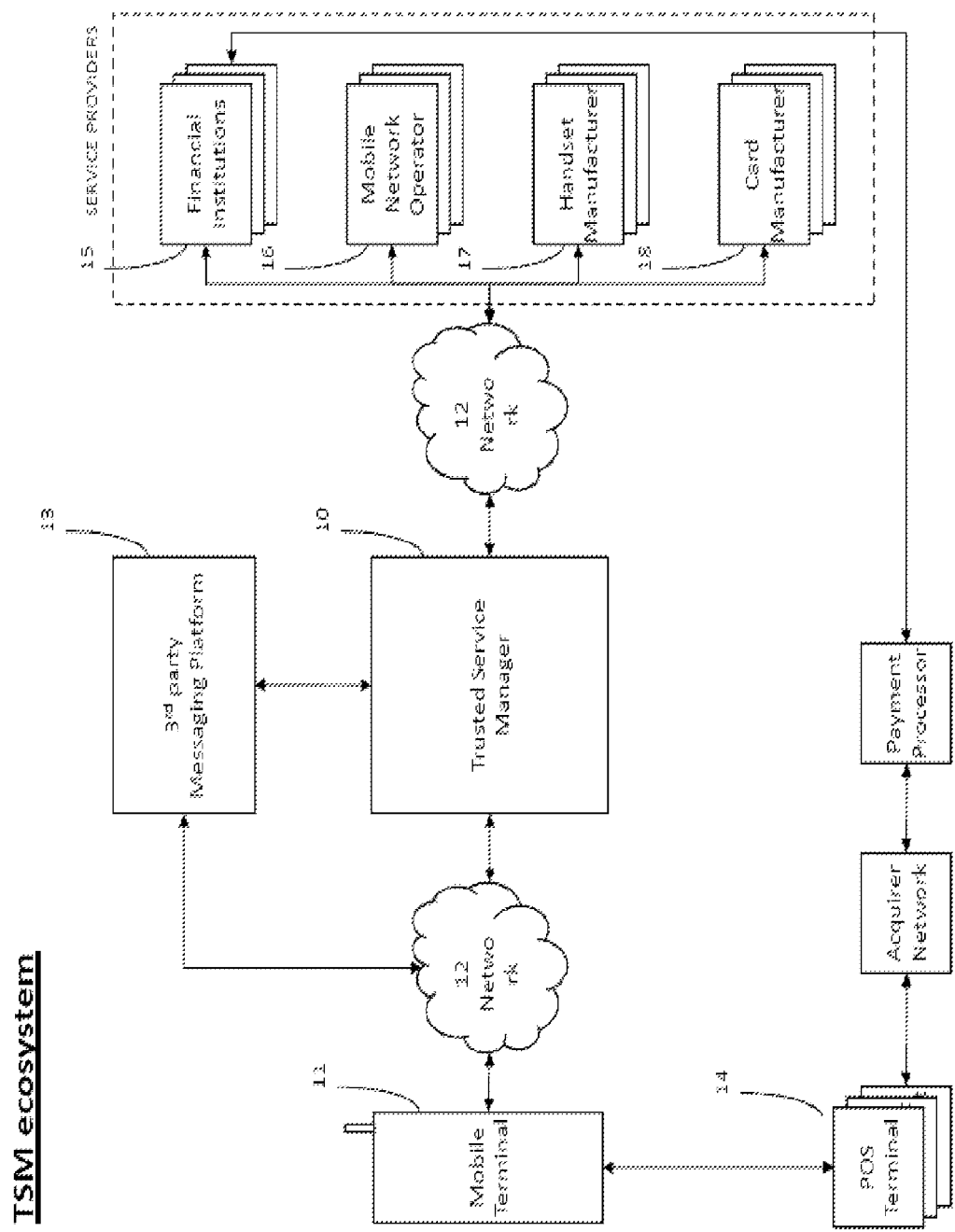
FIG. 1 is a system diagram of a Trusted Service Manager (TSM) ecosystem supporting the over-the-air (OTA) provisioning process through OTA proxy according to an exemplary embodiment of the present invention.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, or YZ). Throughout the drawings and the detailed description, unless otherwise described, the same drawing reference numerals are understood to refer to the same elements, features, and structures. The relative size and depiction of these elements may be exaggerated for clarity, illustration, and convenience.

FIG. 1 is a system diagram of a trusted service manager (TSM) ecosystem supporting over-the-air (OTA) provisioning process through OTA proxy according to an exemplary embodiment of the present invention. A more detailed explanation on the OTA proxy may be found in the co-pending provisional application entitled "SYSTEM AND METHOD FOR PROVISIONING OVER THE AIR OF CONFIDENTIAL INFORMATION ON MOBILE COMMUNICATIVE DEVICES WITH NON-UICC SECURE ELEMENTS" filed Dec. 30, 2010.

As shown in FIG. 1, a system employing TSM technology with OTA proxy provisioning may include a TSM system 10, mobile terminal 11, network 12, third party messaging platform 13, Point of Sale (POS) terminal 14, financial institution 15; mobile network operator (MNO) 16; handset manufacturer 17; and card manufacturer 18. For the purposes of this disclosure, financial institution 15, MNO 16, handset manufacturer 17, and card manufacturer 18 will be collectively referred to as Service Providers (SP). However, the list of SPs are not limited to the SPs provided in FIG. 1.

Figure 5:
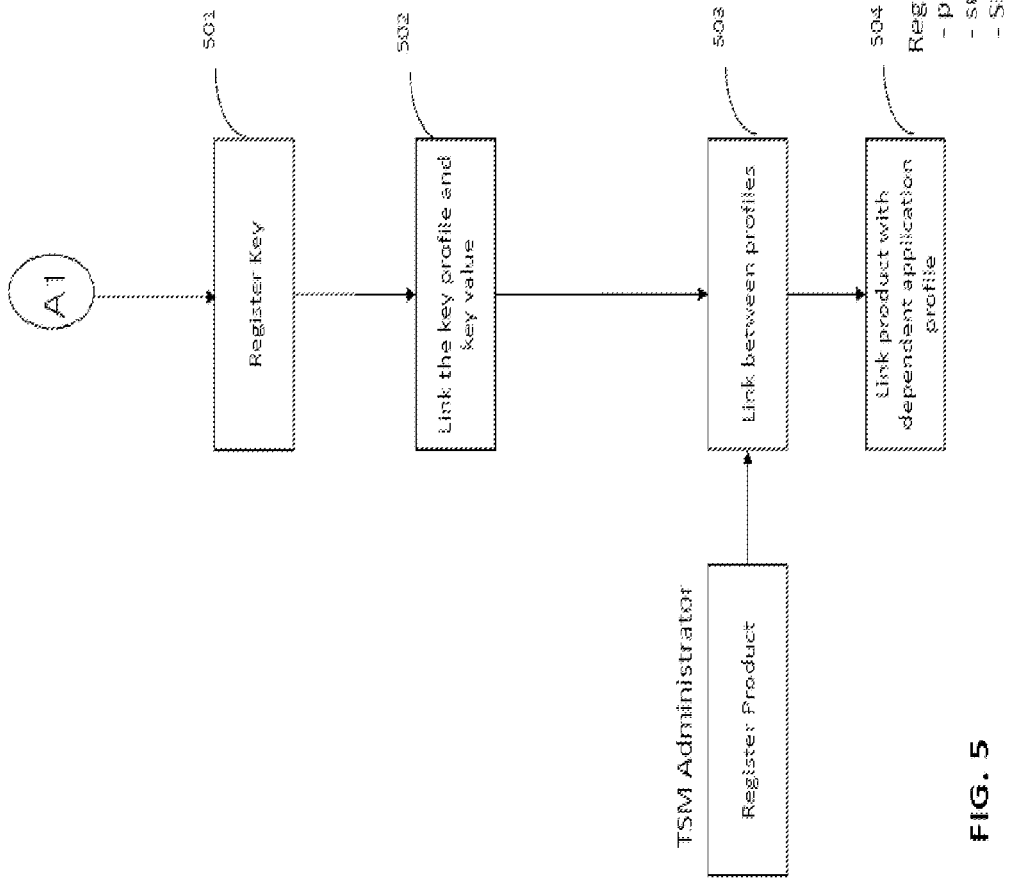
FIG. 5 is a flow diagram illustrating in detail how specified profile connections are made to form a registered product according to an exemplary embodiment of the present invention.

Before TSM system 10 may be fully utilized by the user, SPs 15-18 may go through a pre-registration process as outlined in FIG. 5. In an example, the network 12 may refer to a cellular network, which may include one or more base stations to enable mobile terminal 11 to communicate with other mobile terminals or third party entities. In addition, network 12 may also include any other type of suitable communication network, such as the Internet, traditional wired telephone lines, and other suitable network technologies.

The handset manufacturers 17 may include manufacturers of embedded secure elements (SEs), and card manufacturers 18 may include manufacturers of micro secure digital (SD) secure element (SE) (collectively referred to as non-Universal Integrated Circuit Card (UICC) SEs). As different SE manufacturers may provide different OTA keys than those that are used for conventional UICC SEs, handset manufacturers 17 and card manufacturers 18 may provide their OTA keys to their respective SEs to the TSM 10 in the pre-registration process. In addition, the handset manufacturers 17 and card manufacturers 18 may provide their OTA keys upon request by the mobile terminal 11 rather than going through the pre-registration process. In an example, the OTA keys may be generated by the SE manufacturers, or obtained through a third party. For the purposes of simplicity, the OTA key may be referred simply as a "key". However, the general term of "key" is not limited to OTA keys only, but may also refer to a transport key, SE keys, and other keys that may be used to conduct secure transactions involving SEs.

In an example, once the mobile terminal 11 has been provisioned with contactless card applets, which may be used with a Near Field Communication (NFC) technology installed in the mobile terminal 11, owner of the mobile terminal 11 may make a purchase at the NFC enabled POS terminal 14 by waving the mobile terminal 11 at the corresponding POS terminal 14. Subsequently, once a purchase is made with the mobile terminal 11, the acquirer network and payment processor work together to ensure the payment gets updated at the financial institution 15. This end user application, however, does not involve the described TSM 10 ecosystem and is illustrated to provide a description of a complete ecosystem according to an exemplary embodiment of the present invention.

Figure 2:
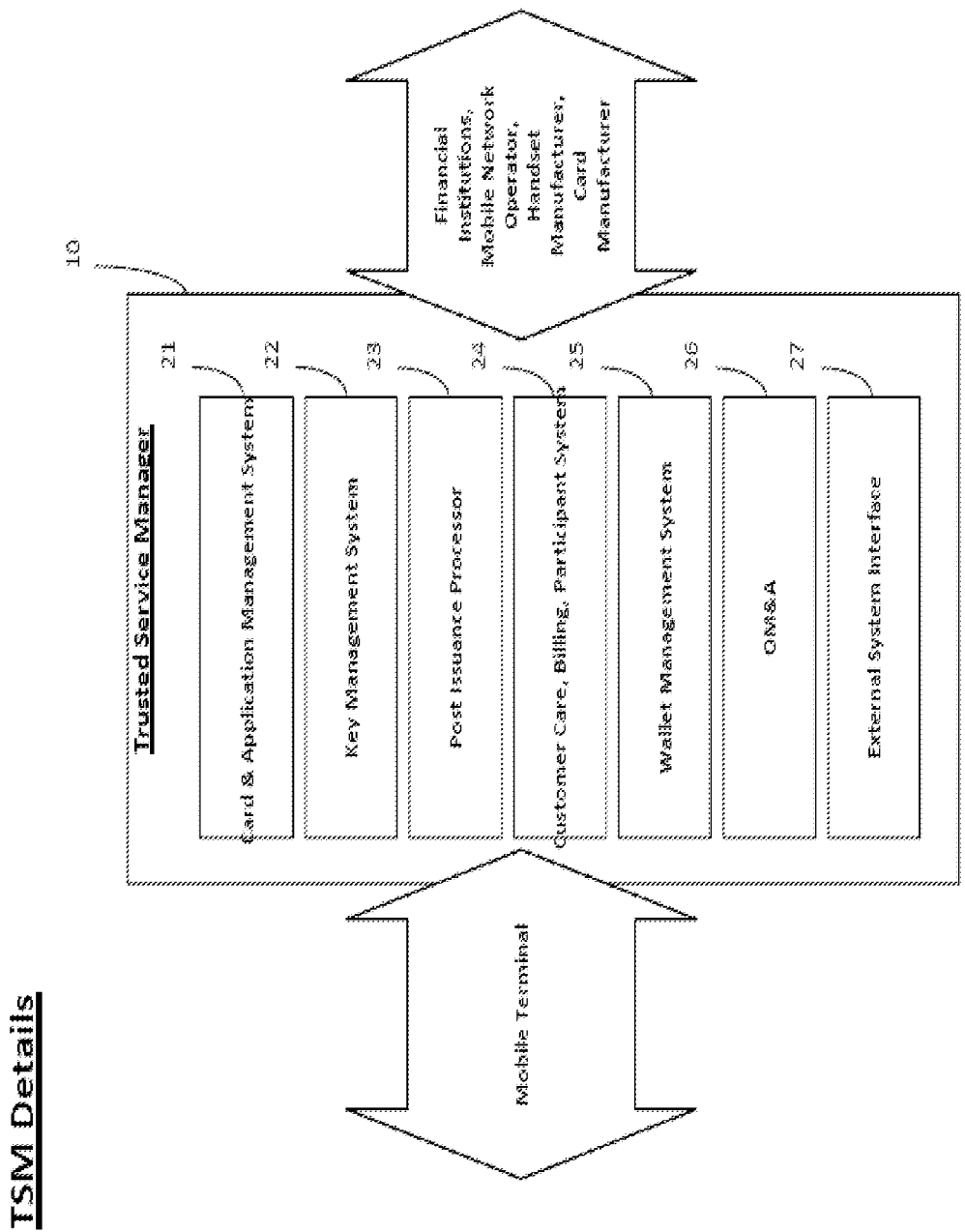
FIG. 2 is a block diagram of a TSM system, its components, and its relationship with service providers according to an exemplary embodiment of the present invention.

Further, TSM 10 may include multiple components for more efficient processing. FIG. 2 is a block diagram of a TSM system, its components, and its relationship with service providers according to an exemplary embodiment of the present invention.

A TSM system 10 may include a Card & Application Management System (CAMS) 21; Key Management System (KMS) 22; Post Issuance Processor (PIP) 23; Customer Care, Billing, Participant System (CBPS) 24; Wallet Management System (WMS) 25; OM&A 26; External System Interface (ESI) 27; and a database (not pictured) to store and manage various information provided to TSM 10. The database storage may reside within a specified component, as an independent component within TSM 10, or separate from TSM 10 as an external component.

Component CAMS 21 may be responsible for managing the life cycles of SEs, secure domains, and applets. Life cycle refers to the various status of the respective SEs or applets installed in the mobile terminal 11. In an example, the life cycle of a SE may include operating system (OS) Native, initialized, and secured. Life cycle of an applet may include lock and unlock. Some of the functionalities offered by the CAMS 21 may be management of SE type, SE profile, SE identification (ID), application profile, and card profile. One or more SEs may be identified individually and controlled by CAMS 21 with its own SE ID (Card Reference Number (CRN), Card Image Number (CIN), Card Production Life Cycle (CPLC), Card Serial Number (CSN)).

Component KMS 22 may be responsible key management to allow secure transactions. Key management activities may be related to secure log in, access control, audit, key profile management, key management, key profile exchange and recovery, and delegated management.

Component PIP 23 may be primarily responsible for provisioning information into the mobile terminal 11, which may include preparation of data to be provisioned and the actual execution of sending and receiving provisioning messages provided in Application Protocol Data Units (APDU) and data preparation prior to servicing.

Component CBPS 24 may be responsible for customer management. This component may maintain and monitor customer account status as well as data related to SP service subscriptions. The CBPS 24 may modify the status of the SPs related to the customer as specified events occur (e.g. stolen mobile terminal) or requested by the SP.

Component WMS 25 may be responsible for management of a mobile wallet application and its associated mobile card widgets stored therein. This component may provide a mobile ID to associate the mobile wallet application stored in the user's mobile terminal 11 as well as all of the individual widgets stored in the mobile wallet application. In addition, this component may store any of the user preferences made by the wallet owner (e.g. language, font, default card, etc.). This system may hold the master configuration, which may provide synchronization benefit for the mobile wallet application. This particular component may reside within the TSM 10 or as a separate system.

Component OM&A 26 may be responsible for providing an interface for external managers to access TSM 10 directly. In instances where a SP or an external party desires to enter in data or modify certain items directly, the designated personnel may access TSM 10 via OM&A 26 to make the necessary modifications.

Component ESI 27 may provide for an interface for one or more SPs to send and receive data. As SPs may have specific or individualized protocol they utilize, ESI 27 may translate commands and requests arriving or leaving TSM 10 as appropriate.

The described TSM 10 may be implemented as a third party entity positioned to consolidate information from financial institutions 15, MNOs 16, Handset Manufacturers 17, and Card Manufacturers 18. As TSM 10 holds information collected from various parties, the mobile terminal 11 may interact with TSM 10 rather than various discrete entities. In sum, TSM 10 may act as an integration point for one or more SPs or external parties the mobile terminal 11 may deal with, providing for a seamless and more efficient operation of mobile services.

All of the above described components may reside within the TSM system or separately according to business or system design specifications. In an example, TSM 10 may be an individual server residing on a network or a collaboration of various servers.

Figure 3:
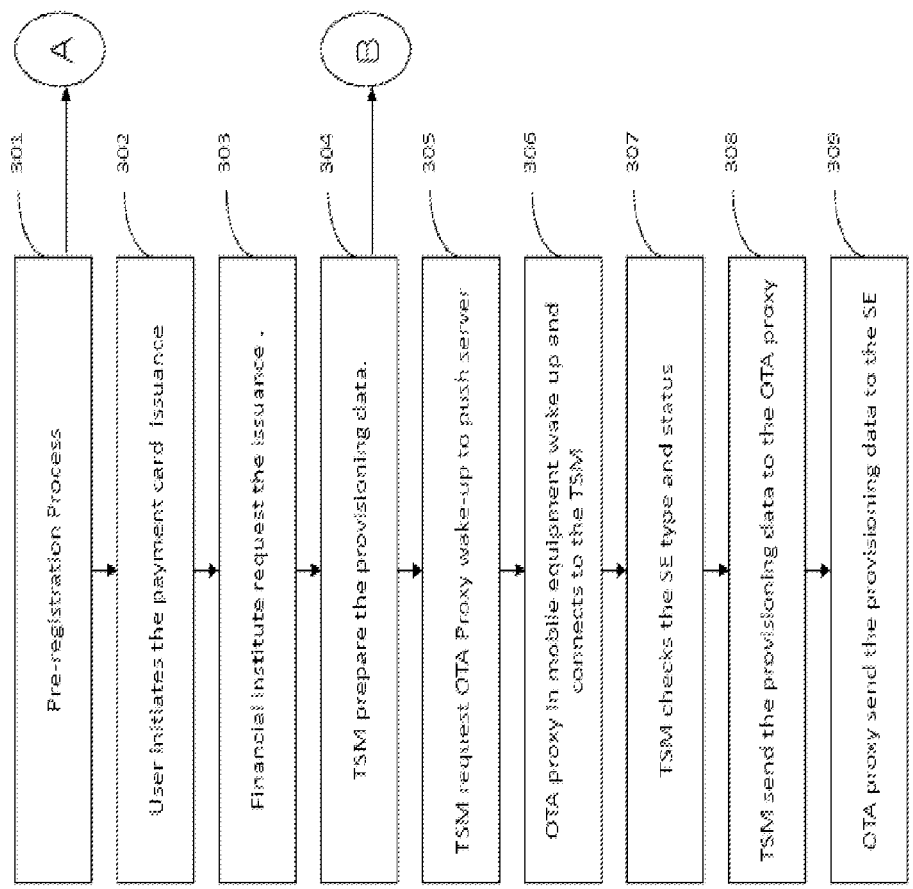
FIG. 3 is a flow diagram illustrating a high level OTA provisioning process though OTA proxy according to an exemplary embodiment of the present invention.

FIG. 3 is a flow diagram illustrating a high level OTA provisioning process via OTA proxy according to an exemplary embodiment of the present invention. Once the requesting mobile terminal 11 has installed a mobile wallet application and accompanying OTA proxy application, provisioning process follows the process outlined below.

Prior to any provisioning of mobile card application, one or more SPs may be pre-registered in TSM 10 as shown in step 301. A more detailed illustration and explanation of this process will be provided in FIG. 4.

Once SP profiles have been registered, the user may select a registered SP's payment card for provisioning by the mobile terminal 11 in step 302.

After a request is made to provision the selected mobile payment card, the financial institution 15 requests its issuance to TSM 10 in step 303. Request for service subscription may include identifying information such as Mobile Subscriber Integrated Services Digital Network Number (MSISDN) along with encrypted account related information that is to to be provisioned.

TSM 10 in response to the request begins preparation of the provisioning data in step 304. Upon receipt of provisioning information, an internal data link is created to log the service request made by the financial institution 15. Further, a portion of the account data transmitted by the financial institution 15 may be maintained to identify a card account with the requesting user within TSM 10. For security purposes, the entire account number may not be maintained. However, the entire account number may be maintained within TSM 10 for business reasons. A more detailed illustration and explanation of how links are provided between two or more profiles are provided in FIG. 5.

Once the request has been logged in TSM 10, TSM 10 transmits a wake up request command to a mobile push server (e.g. Cloud to Device Messaging (C2DM) platform) along with identifying information (i.e. MSISDN) in step 305, which in turn relays the command to wake up the OTA proxy residing in the requesting user's mobile terminal 11 in step 306.

In a preferred embodiment of this invention, OTA proxy may be asleep prior to being awaken. Once OTA proxy is woken or initialized, the OTA proxy may connect to TSM 10. The OTA proxy may connect to TSM 10 automatically or upon receiving a user input after OTA proxy is awake. Upon connection, OTA Proxy gathers the SE and mobile terminal specific information and sends the collected information to TSM 10 for verification. However, OTA Proxy may gather the specified information prior to connection or provide the information to TSM 10 in a separate process. In receipt of provided information, TSM 10 conducts an internal check to see if at least one of the MSISDN, International Mobile Equipment Identity (IMEI)/Mobile Equipment Identifier (MEID), Card Image Number (CIN)/Integrated Circuit Card Identification (ICCID) of mobile terminal 11 and SE match the user information stored in TSM 10. As this internal check is conducted when OTA proxy connects to TSM 10, additional security is provided to verify SE associated with the user account along with the associated the mobile terminal 11.

Once OTA proxy connects to TSM 10 with the collected information and TSM 10 conducts the internal check has been conducted, TSM 10 may analyze the provided data for any additional processing SE may require and the best mode of provisioning the information into the respective mobile terminal 11 in step 307.

More specifically, in step 307, TSM 10 may identify SE status and SE type for identifying proper processes to be performed for provisioning. As processing of stored SE may be based on its status, analysis of SE status and corresponding processes may be conducted prior to accessing the information stored in the SE. More specifically, based on the SE status, some preparation steps may be executed to secure the SE for processing commands received through the OTA proxy. In an example, SE equipped in the mobile terminal 11 may have any of the 3 statuses: operating system (OS) native, initialized, and secured.

If the status of the SE is determined to be "secured" no further preparation steps may be executed. The "secured" state for the SE may refer to an intended operating card life cycle state in post issuance. On the other hand, if the status of the SE is determined to be "initialized" then TSM 10 may provide a final issuer master key to secure the SE. The "initialized" state for the SE may refer to an administrative card production state. Lastly, if the status of the SE is determined to be "OS native", then pre-personalization process may be conducted, which may include providing an initial issuer master key and a final issuer master key to the SE. The "OS native" state for the SE may refer to a status that SE is not initialized by manufacturer's initialization method.

After status of the SE has been determined, an analysis of SE type may be performed to determine the type of protocol that may be run within OTA proxy in order to provision into the identified SE. If the SE is a UICC type or an embedded type, SE may be accessed to modify the information stored in the SE. Alternatively, if the SE is a Micro SD type, additional process specific protocol may be executed to access or to modify the information stored in the SE. Since a person ordinarily skilled in the art understands what type of protocols may be used to access the Micro SD type, discussion thereof is omitted herein.

After the best mode of provisioning has been determined, TSM 10 prepares and transmits the provisioning data in APDU format to the OTA proxy in step 308. OTA proxy in receipt of APDU commands by TSM 10 relays the provisioning data to the SE in step 309.

OTA proxy is allowed access to the non-UICC SEs through the various keys that have been loaded onto TSM 10 along with SE specific Application Programming Interface (API), which may be exchanged offline. Through the incorporation of these attributes, OTA proxy protocol is provided access to the SE to be provisioned.

Figure 4:
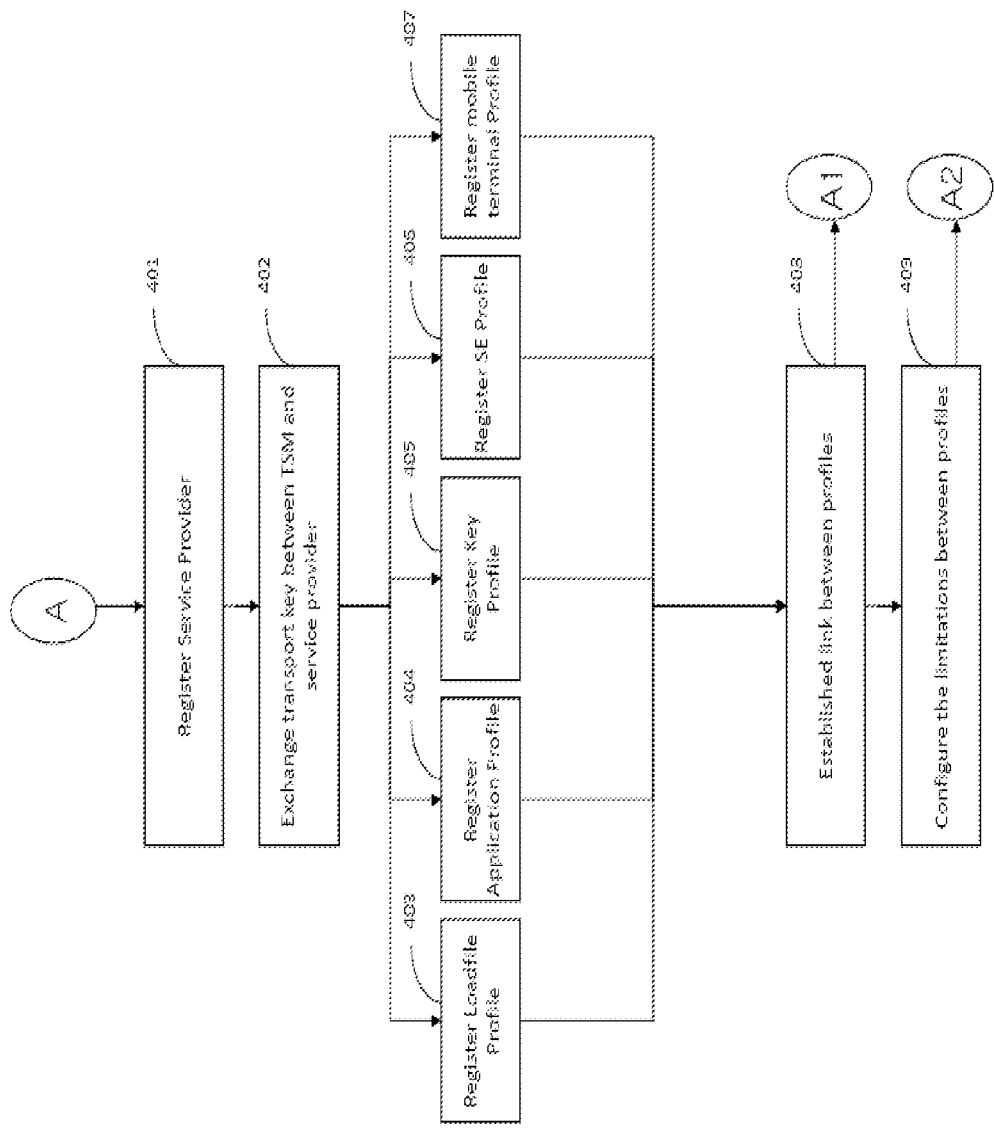
FIG. 4 is a flow diagram illustrating pre-registration steps a service provider may take in order to take advantage of the TSM system according to an exemplary embodiment of the present invention.

FIG. 4 is a flow diagram illustrating pre-registration steps a service provider may take in order to take advantage of the TSM system according to an exemplary embodiment of the present invention. In an example, SPs may first register their information into TSM 10 for use by TSM 10. A SP may be an entity that may seek to provision its services onto the mobile terminal 11.

In step 401, SP's information is registered into TSM 10. This process may be achieved by various methods. For example, the SP may transmit an encrypted email with basic registration information along with a Pretty-Good-Privacy (PGP) public key. Registration may also be achieved in person, by phone, through an automated system or other suitable methods to exchange information. TSM administrator may then enter SP's basic information into TSM 10 and provide a unique SP ID, transport key ID, and the SP type (a financial institution 15, a MNO 16, a handset manufacturer 17, or a card manufacturer 18). TSM administrator may be a person, an automated system, or a separate entity. Afterwards, TSM 10 may create a SP account and generate a secure token for the correlating SP ID. Once that is accomplished, TSM 10 encrypts the SP account information in an encrypted email to send to the requesting SP.

In step 402, a transport key is exchanged between TSM 10 and the SP. Transport key serves to provide secure transmission of sensitive data between various parties. Such security may be provided through encryption, cryptographic transformation of data through Message Authentication Code (MAC), or other suitable security measures. The SP transmits a request to receive a transport key set to TSM 10. In response, TSM 10 checks for duplicate keys assigned to the requesting SP, and if no such key has been assigned, then TSM 10 generates transport key sets inside a Hardware Security Module (HSM). In an example, transport key sets may include three numbered keys including an encryption key (ENC), data encryption key (DEK), and message authentication code (MAC). TSM 10 exports the generated keys in an encrypted form using the PGP key provided by the SP in step 301. Once the transport key set has been exchanged between the parties, at least one of the following SP related profiles may be provided to TSM 10 for registration: a load file profile 403, an application profile 404, a key profile 405, a SE profile 406, and a mobile terminal profile 407. These processes may be performed simultaneously or independently. Further, the number of profiles is not limited to the profiles described above. In an example, a larger number of registered profiles may provide for a more specific product that may be suitable to a user, and a smaller number of registered profiles may provide for a more generalized product that may be offered to various users.

Load file profile 403 may describe the application code file that contains one or more applications, or describe the load files that make up an application code. Application profile 404 describes a smart card application as metadata, which may be utilized later for creating an instance of the application. Key profile 405 describes basic profile information and key information as metadata, which may be utilized for creating an instance of the key. ISD master keys are also registered in the system, including Initial Supplier Key (ISK), Initial Issuer Master Key (KMC), and Final Issuer Master Key (CMK). Key profile may contain metadata for one or more keys, including ISK, KMC, and CMK. SE profile 406 describes attributes of a smart card. More specifically, the SE profile may include, without limitation, information related to manufacturer, version, name, model, contact/contactless attributes (e.g., baud rate). And lastly, mobile terminal profile 407 describes attributes of a mobile terminal 11, including NFC capability, supported SE types, and OTA channel support.

Once one or more profiles have been provided to TSM 10, TSM 10 establishes one or more links between the provided profiles to provide for one or more application products for users to request. The profiles may be sent to TSM 10 directly through the network 12, by physical embodiments of provided data, or other suitable methods that may be available to transfer information. Two or more of these profiles may be linked in step 408. A process of how these profiles may be linked together is explained in more detail in FIG. 5.

Subsequently, once links are established between profiles, limitations may be configured between profiles in step 409. One or more application products may be limited according business rules that have been aggregated by TSM 10 based upon agreements between the SPs. For example, a certain MNO 16 (e.g. Sprint®) may refuse to work with a specific financial institution 15 (e.g. Citibank®) for business reasons. In addition, there may be some technical limitation barring providing certain products to user mobile terminal 11, such as an incompatible mobile operating system. Based upon these limitations, a filtered list of application products may be available for request by the consumer. A detailed explanation of how the limitations may be configured between profiles is explained further in detail in FIG. 6.

FIG. 5 is a flow diagram illustrating in detail how specified profile connections are made to form a registered product according to an exemplary embodiment of the present invention.

As mentioned in FIG. 4, in steps 403-407, various profiles are registered into TSM 10 by the SPs. However, when a key profile 405 is registered, additional steps may be taken. In step 501, keys themselves are registered by the SP if they have not been provided along with the key profile 405. Or if keys were submitted along with the key profile 405, keys may be extracted by the TSM administrator or TSM 10. Further, once both the key and key profiles have been registered, a link is made between the key and the key profile in step 502 to provide an instance of a key for usage by TSM 10.

In step 503, once one or more profiles have been registered in TSM 10, TSM 10 or the TSM administrator compiles the registered profiles to begin registering application products for deployment based on one or more possible combinations. The application product may include the following attributes: product name, logo, group, SE type, security domain application identifier (AID), and Instance AID. For example, a product instance may be composed of a Citi® type bank, Visa® issuance, Android® operating system (OS), Sprint® mobile service, and other relevant attributes. This application product registration step may be repeated until appropriate application products are registered. This step may be executed by using a suitable software or application that may be commonly known to a skilled artisan or by using specialized software or application constructed for this purpose. Further, this step may be executed by other personnel, an automated system or by other suitable systems.

Once the application products have been configured through linking various profiles, the application products may be analyzed to see if accompanying dependent application products may be appropriate in step 504. For example, a contactless FDC-enabled credit card applet, as an application product, may require an accompanying Payment Procedure Secure Elements (PPSE) application in order to use the respective applet in the mobile terminal 11. As such, providing of appropriate dependent applications may provide seamless usage of application products to ensure that the user has appropriate control mechanisms in place to use the provisioned application products.

Figure 6:
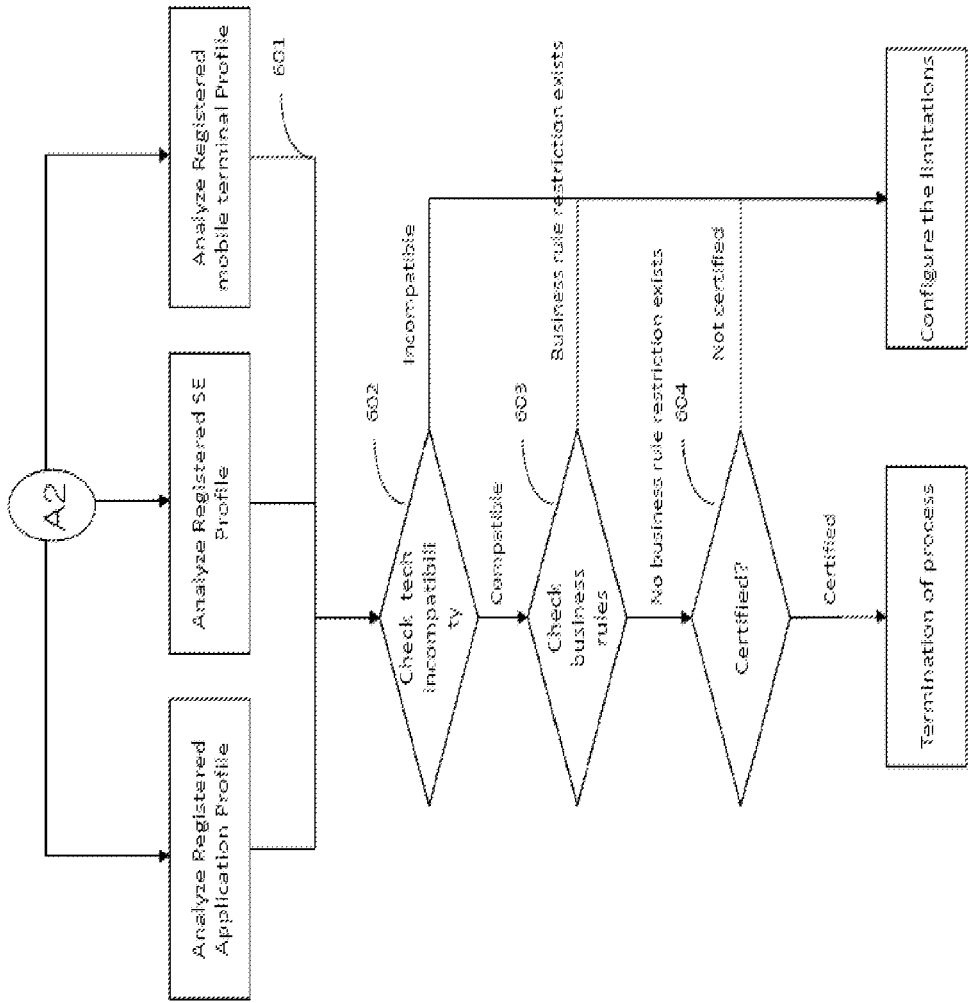
FIG. 6 is a flow diagram illustrating in detail how the specified limitations are configured between profiles according to an exemplary embodiment of the present invention.

FIG. 6 is a flow diagram illustrating in detail how the specified limitations are configured between profiles according to an exemplary embodiment of the present invention.

In step 601, TSM 10 analyzes one or more of the registered application profiles 404, registered SE profiles 406, and registered mobile terminal profiles 407.

Based on the profiles provided, one or more profiles are checked against the other profiles for technical incompatibility in step 602. If the provided profiles are compatible, then no limitations may be applied to the respective application product. However, if there is a technical incompatibility, a limitation may be applied so that the requesting user is not provided with products that may be technically incompatible.

In step 603, if there is no technical incompatibility, then stored business rule limitations are checked against for its applicability to the respective application product. For example, if a MNO 16 (e.g. Sprint®) refuses to work with a financial institution 18 (e.g. Citibank®), a business rule limitation may be applied to the application product.

If there are no business rule limitations that are applicable, TSM 10 checks the application product for certification requirements imposed by credit card issuers, such as VISA® or Master Card®, in step 604. If the application product has not been certified by a specified issuer, then a certification limitation may be applied to the application product. If there is no certification incompatibility, then no limitation may be imposed on the registered profiles.

While steps 602 to 604 are illustrated to flow in a particular order, this order is for illustrative purposes only and is not limited to the provided sequence. In an example, steps 602 to 604 may be conducted all at once, or in any combination of steps. Further, steps 602 to 604 may be processed in the reverse order, or any other order. Also, compatibility check at one particular step may not prevent providing other compatibility checks. All or some of the compatibility checks may be conducted by TSM 10. For example, TSM 10 may check for business compatibility only, or business and technical compatibility only. Lastly, these compatibility checks are not limited to the provided categories, and more compatibility categories may be provided to TSM 10.

Figure 7:
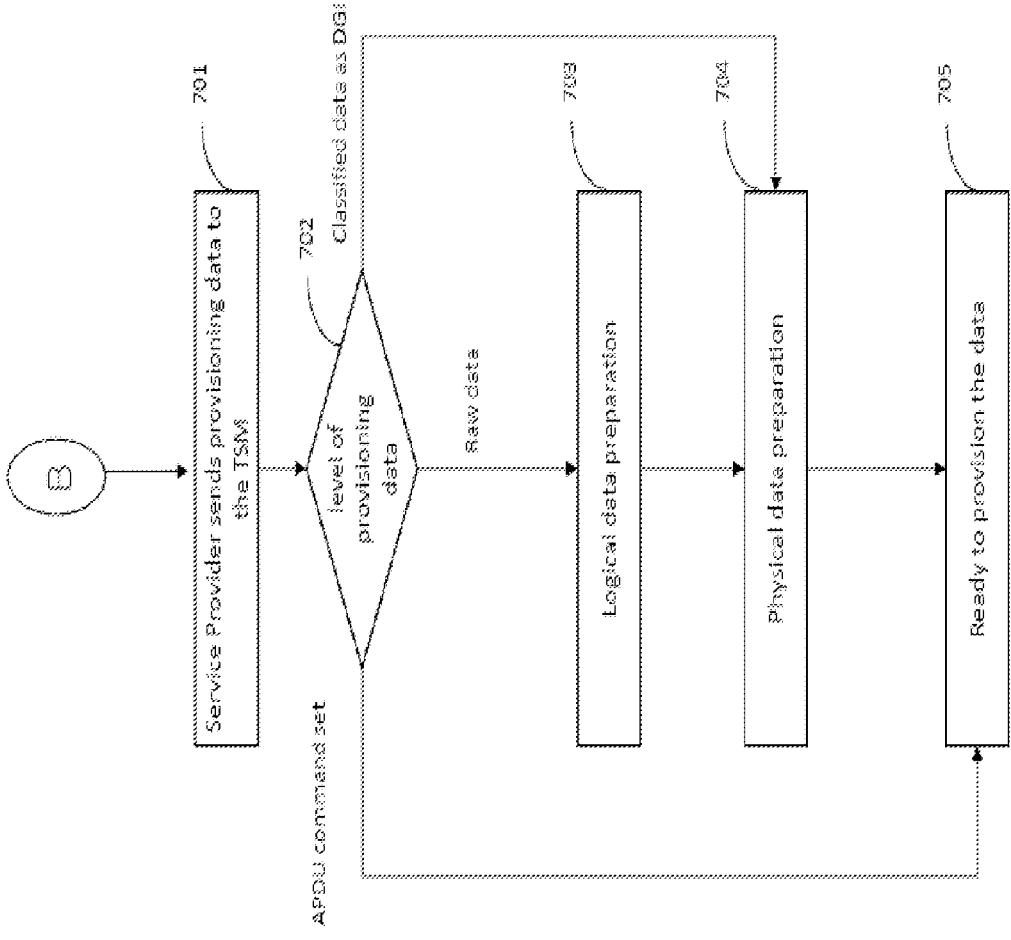
FIG. 7 is a flow diagram illustrating an exemplary data preparation service offered by the TSM system for provisioning according to an exemplary embodiment of the present invention.

FIG. 7 is a flow diagram illustrating an exemplary data preparation service offered by the TSM system for provisioning according to an exemplary embodiment of the present invention.

In step 701, a SP transmits provisioning data, such as credit card account information, to TSM 10. In step 702, analysis is performed by TSM 10 to check the data preparation level of the provisioning data. As various SPs may have different capabilities in preparing data for submission, some data may require more data preparation than others. For example, smaller financial institutions may not have the technical capabilities in providing prepared data or have the necessary bargaining power to contract out to a third party data preparation service. In an example, data provided by the individual SPs may be provided in three different formats: APDU format, Data Grouping Identifier (DGI) format, and raw data format.

If it is determined that the service provider has provided the data in a APDU format, TSM 10 may not require any additional processing before provisioning the data as provided by the SP as illustrated by step 705.

If it is determined only the logical data preparation has been performed by the SP, then TSM 10 may classify the data as DGI format and begin physical data preparation in step 704 to convert the DGI data into APDU format. Physical data preparation may be executed using one or more suitable methods available. Afterwards, the provided data may be ready for provisioning in step 705.

Lastly, if it is determined that the service provider did not prepare the data at all and only the raw data is provided, TSM 10 first conducts a logical data preparation as illustrated in step 703. Logical data preparation may be executed using one or more suitable methods available. Once logical data preparation is finished, another level of physical data preparation is required in step 704 before it is ready for provisioning in step 705. Since logical data preparation and physical data preparation are well known in the art, further discussion thereof will be omitted from this disclosure.

By providing data preparation service without respect to level of data preparation provided by the SP, TSM 10 allows even the smaller SP, which may not have the necessary commercial leverage or technical capabilities, to use the TSM 10 for provisioning.

Figure 8:
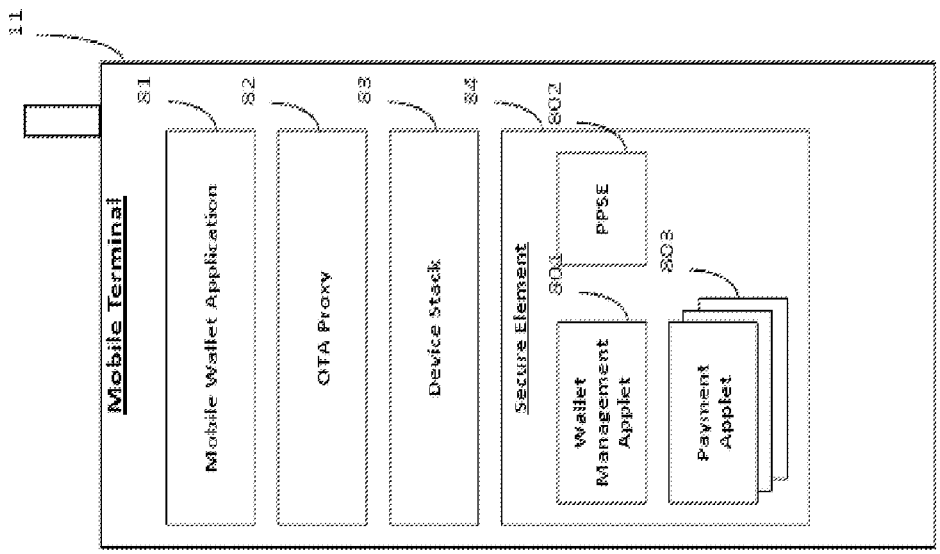
FIG. 8 is a system diagram illustrating exemplary provisioned mobile terminal according to an embodiment of the present invention according to an exemplary embodiment of the present invention.

FIG. 8 is a system diagram illustrating exemplary provisioned mobile terminal according to an embodiment of the present invention according to an exemplary embodiment of the present invention.

Once the mobile terminal 11 has been provisioned according the present disclosure, the mobile terminal 11 may include mobile wallet application 81; OTA Proxy 82; Device Stack 83; and Secure Element 84.

Mobile wallet application 81 may provide the user with a graphically displayed mobile wallet interface, which may include various components such as payment widgets that are tied to the installed payment applet 803 as well as other components (e.g. coupons, transport pass, phone bill, and etc.).

OTA proxy 82 may facilitate provisioning of confidential information, such as financial applications and related account information into the mobile terminal 11's SE 84. The OTA Proxy 82 is a mobile client, which supports OTA post-issuance related services to the secure element in a mobile terminal. As SE types, Micro SD and Embedded SEs (i.e. non-UICC SE) cannot support conventional SAT/SUSAT/CAT framework, OTA Proxy over OTA may be used by a SP to transmit data to mobile terminals 11 equipped with the non-UICC SEs. However, if desired, OTA proxy can also provide an alternative method, over the conventional method, to provision SEs that can support conventional SAT/SUSAT/CAT framework (e.g. UICC/SIM/USIM).

SE 84 may include a Wallet Management Applet (WMA) 801; PPSE 802; and Payment Applet(s) 803. When a payment applet 803 is provisioned into the SE of the mobile terminal 11, the payment applet 803 may be located within the SE to prevent unauthorized access to account sensitive information that may stored within the payment applet. Payment applet 803 may include Application ID, Application label or logo, and account specific information that may not accessible by the user. Further, when payment applet 803 is provisioned in the SE 84, PPSE 802 may also be provisioned to manage the payment applet 803 during a payment transaction. In order for retailers and manufacturers to select a specific payment applet during payment at a POS terminal 14, PPSE 802 manages relevant Application ID and Application label of the payment applet for selection. However, since mobile terminals 11 cannot access the payment applets 803 directly, a copy of the account specific information stored in the payment applet 803 is provisioned as a separate WMA 801 during the original provisioning process of the payment applet 803. However, WMA 801 may be provisioned independently from the provisioning of the payment applet 803 according to business needs. By providing a duplicate record of the payment applet 803 in WMA 21, the user of the mobile terminal 11 may be access account specific information stored in SE 84.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for providing an application product using a trusted service manager (TSM) server including a processor, a memory and an interface, the method comprising:
    receiving by the processor of the TSM server, at least two of an application profile, a load file profile, a secure element (SE) profile, and a mobile terminal profile of a mobile terminal from service providers through the interface of the TSM server;
    establishing by the processor of the TSM server, a link between two profiles among the received at least two profiles, wherein the link is established for assembling the application product;
    applying by the processor of the TSM server, a limitation to the application product, wherein the applied limitation determines whether the application product is accessible to a user;
    receiving by the processor of the TSM server, mobile terminal information, wherein the mobile terminal information comprises at least one of operating system information, SE type information, hardware information, and application information stored in the mobile terminal; and
    filtering by the processor of the TSM server, an applicable application product based on the applied limitation and the mobile terminal information,
    wherein said applying the limitation comprises determining whether there is a business incompatibility between the service providers based on business rules of the service providers aggregated by the TSM server and stored in the memory of the TSM server and applying a business rule limitation to the application product in response to a determination that there is the business incompatibility between the service providers, and
    wherein said applying the limitation further comprises determining whether the application product is certified by a financial institution and applying a certification limitation to the application product in response to a determination that the application product is not certified by the financial institution, and said applying the limitation is performed during a process for preregistering the service providers in the TSM server and before provisioning of a mobile application in the mobile terminal.

2. The method of claim 1, wherein the application profile describes a smart card application as metadata for creating an instance of the application.

3. The method of claim 1, wherein the load file profile describes one or more load files that make up an application code.

4. The method of claim 1, wherein the mobile terminal profile describes attributes of the mobile terminal, the attributes comprise at least one of Near Field Communication (NFC) capability, supported SE types, and over-the-air (OTA) channel supportability.

5. The method of claim 1, further comprising:
    receiving a key profile;
    receiving a key; and
    establishing a link between the key profile and the key.

6. The method of claim 1, wherein the application product comprises at least one of a product name, a logo, a product group, a SE type, a security domain application identifier (AID), and an instance AID.

7. The method of claim 5, wherein the key profile describes key information as metadata for creating an instance of a key.

8. The method of claim 1, wherein said applying the limitation to the application product further comprises determining whether there is a technical incompatibility between at least two of the mobile terminal, an operating system of the mobile terminal, and a SE type and applying a technical limitation to the application product in response to a determination that there is the technical incompatibility between the at least two of the mobile terminal, the operating system of the mobile terminal, and the SE type.

9. The method of claim 1, wherein the service providers comprise at least two of the financial institution, a mobile network operator, a handset manufacturer, and a card manufacturer.

10. The method of claim 1, wherein the financial institution comprises at least one of a credit card issuer and a debit card issuer.

11. The method of claim 1, wherein said establishing the link between the received profiles comprises establishing a link between the application product and a dependent application product.

12. A method for filtering an application product using a trusted service manager (TSM) server including a processor, a memory and an interface, the method comprising:
- receiving by the processor of the TSM server, a key profile and at least two of an application profile, a load file profile, a key profile, a secure element (SE) profile, and a mobile terminal profile of a mobile terminal from service providers through the interface of the TSM server;
- receiving by the processor of the TSM server, a key;
- establishing by the processor of the TSM server, a first link between the key profile and the key;
- establishing by the processor of the TSM server, a second link between two profiles among the received at least two profiles, wherein the second link is established for assembling the application product;
- applying by the processor of the TSM server, a limitation to the application product, wherein the limitation is selected from the group consisting of a technical limitation, a business rule limitation, and a certification limitation;
- receiving by the processor of the TSM server, mobile terminal information, wherein the mobile terminal information comprises at least one of operating system information, SE type information, hardware information, and application information stored in the mobile terminal; and
- filtering by the processor of the TSM server, an applicable application product based on the applied limitation and the mobile terminal information; and
- displaying by the processor of the TSM server, the filtered applicable application product,
- wherein said applying the limitation comprises determining whether there is a business incompatibility between the service providers based on business rules of the service providers aggregated by the TSM server and stored in the memory of the TSM server and applying the business rule limitation to the application product in response to a determination that there is the business incompatibility between the service providers, and
- wherein said applying the limitation further comprises determining whether the application product is certified by a financial institution and applying the certification limitation to the application product in response to a determination that the application product is not certified by the financial institution, and said applying the limitation is performed during a process for preregistering the service providers in the TSM server and before provisioning of a mobile application in the mobile terminal.

* * * * *